United States Patent [19]

Kim

[11] Patent Number: 4,503,416
[45] Date of Patent: Mar. 5, 1985

[54] GRAPHITE FIBER TACTILE SENSOR
[75] Inventor: Wontaik Kim, Clifton Park, N.Y.
[73] Assignee: General Electric Company, Schenectady, N.Y.
[21] Appl. No.: 576,289
[22] Filed: Feb. 2, 1984

Related U.S. Application Data

[63] Continuation-in-part of Ser. No. 449,346, Dec. 13, 1982, abandoned.

[51] Int. Cl.³ ............... H01C 10/10; H01R 11/20
[52] U.S. Cl. ....................... 338/99; 338/112; 338/114; 178/18; 200/264
[58] Field of Search ............... 338/99, 100, 101, 108, 338/112, 114; 178/18; 200/264

[56] References Cited

U.S. PATENT DOCUMENTS

| | | | |
|---|---|---|---|
| 2,305,717 | 12/1942 | Bell | 338/114 |
| 3,125,739 | 10/1961 | Deibel et al. | 338/99 |
| 3,503,031 | 3/1970 | Nyhus et al. | 338/99 |
| 4,014,217 | 3/1977 | Lagasse et al. | 178/18 X |
| 4,126,760 | 11/1970 | Gordon | 178/18 |
| 4,143,367 | 3/1979 | Schestay | 338/99 |
| 4,199,637 | 4/1980 | Sado | 338/99 X |
| 4,208,648 | 6/1980 | Naumann | 178/18 |
| 4,210,895 | 7/1980 | Sado et al. | 338/99 |
| 4,289,940 | 9/1981 | Sado et al. | 200/5 A |
| 4,317,012 | 2/1982 | Itoh | 200/264 |

Primary Examiner—Roy N. Envall, Jr.
Assistant Examiner—C. N. Sears
Attorney, Agent, or Firm—Lawrence D. Cutter; James C. Davis, Jr.; Marvin Snyder

[57] ABSTRACT

A layer of carbon fiber materials sandwiched between two conductive layers provides a tactile feedback sensor which is particularly useful in manipulator systems for robotics and assembly automation.

6 Claims, 6 Drawing Figures 4,503,416

GRAPHITE FIBER TACTILE SENSOR

BACKGROUND OF INVENTION

This application is a continuation in part of application Ser. No. 449,346 filed Dec. 13, 1982, now abandoned.

The present invention is related to tactile feedback sensors for use in robot manipulator systems and to sensors employed in robotic systems.

Robotic systems are being used more and more frequently in commercial manufacturing and production. Robotic systems are being called upon to perform a greater and greater range of tasks because of their highly flexible and programmable nature. As a result of this, many different forms of robot "hands" are being provided. These hands are being required to grasp, lift and manipulate a large variety of workpieces without causing damage to them and without slipping or dropping them. Robot hands, grippers, manipulators, etc. are generally termed "end effectors". In comparison with human hands, the end effectors of a robot are only clumsy imitations. Robot manipulators have fewer joints and are generally without any sense of feeling or touch. While robots themselves have earned a reputation of being general purpose atomation devices, the robot end-effectors are not quite as flexible and may have to be specially designed to meet specific job tooling requirements.

The design of robot end effectors, particularly end effectors which are to perform a gripping or grasping function, should generally be specified with several criteria in mind. In particular, the tolerance of the surface that is grasped and its influence on the accuracy in placing a part should be considered. For example, if the machined portion of a cast part is to be inserted into a chuck, and the robot must grasp the cast surface, then the opening in the chuck must be larger than the eccentricity between the cast and the machined surfaces. Additionally, the hands and fingers of the robot manipulator must be able to accommodate changes in the dimension of a part that may occur between part loading and part unloading operations. Consideration should also be given to the delicateness of certain surfaces which are to be grasped and whether or not they may be distorted by excess pressure or scratched by hard manipulator jaws. Furthermore, robot manipulator fingers should have either resilient pads or self-aligning jaws that will conform to the part that is to be picked-up. These manipulator design considerations can all be met if flexible tactile sensors comprising rugged materials are available and an appropriate feedback mechanism is established.

Prior art robot manipulator designs have from time to time considered end effectors which include a large plurality of miniature transducers embedded in them. The transducers usually comprise strain gauge or piezoelectric elements made of thin foils. However, such transducer systems are expensive, are not rugged, and cannot tolerate very hostile environments such as provided by high temperatures or chemically corrosive atmospheres.

SUMMARY OF THE INVENTION

In accordance with a preferred embodiment of the present invention a tactile sensor comprises a carbon fiber layer and two conductive layers disposed in contact with and on opposite sides of the carbon fiber layer so as to form a sandwich-like structure. In this structure, pressure applied to the sensor reduces the electrical resistances measured across the carbon fiber layer. Furthermore, the structure of the present invention permits electrical leads attached to the conductive layers to be disposed within the carbon fiber layer itself. The tactile sensor of the present invention is also configurable in a checkerboard or other regular pattern and is therefore employable to provide a two-dimensional pressure distribution profile signal to the computer mechanism operating the robot arms.

Accordingly, it is an object of the present invention to provide a tactile sensor for robot manipulator and effectors.

It is also an object of the present invention to provide sensors for robots and robot-like devices.

Additionally, it is an object of the present invention to provide a tactile sensor which produces pressure or force distribution information.

Lastly, it is an object of the present invention to provide a tactile sensor for robotic systems which is rugged, flexible, resilient and relatively immune to harsh environmental conditions.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
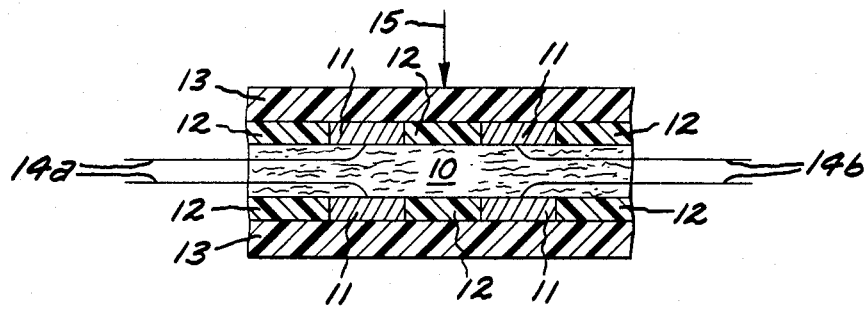
FIG. 1 is a cross-sectional side elevation view of a tactile sensor in accordance with the present invention.

FIG. 1 illustrates a cross-sectional side elevation view of a preferred embodiment of the present invention. In particular, carbon fiber layer 10 is disposed, in a sandwich-like fashion, between a plurality of electrically conductive contacts 11. Contacts 11 generally comprise a planar conductive layer layer which is sufficiently thin so as to be at least somewhat flexible. Contacts 11 are preferably fixed to a resilient insulating layer 13 which is typically preferably chosen to act as either the gripping surface or the surface which is used to attach the tactile sensor to the robot arm or end effector. Although not essential for the practice of the present invention, insulating spacers 12 may be employed to provide a more uniform carbon fiber layer 10. Additionally, electrically conductive lead pairs 14a and 14b are connected to contacts 11, as shown in FIG. 1. In particular, the carbon layer of the present invention may be selected to be sufficiently thick, so as to permit conductive leads to extend through this layer as shown. Additionally, although not perceptible from the cross sectional view of FIG. 1, it is generally preferred that the leads be positioned in a staggered relationship, so as not to interfere with each other when a force is exerted against the center, in a direction such as that illustrated by pressure arrow 15.

For purposes of the present invention, the best form of graphite fiber material is that of a fine-carbon fiber felt mass. The carbon fibers are chopped into small lengths and compacted into a matrix. Following this procedure, the fabrication of sensor elements is simply accomplished by the formation of a sandwich of one or more thicknesses of the felt, between foil electrodes.

Figure 2A:
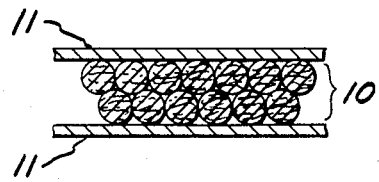
FIG. 2a is a schematic cross-sectional side elevation view illustrating the theory of operation of the tactile sensor of the present invention with particular regard to a no-load condition.
Figure 2B:
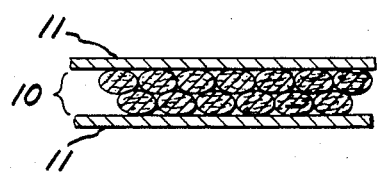
FIG. 2b is a view similar to FIG. 2a except illustrating load condition.
Figure 3:
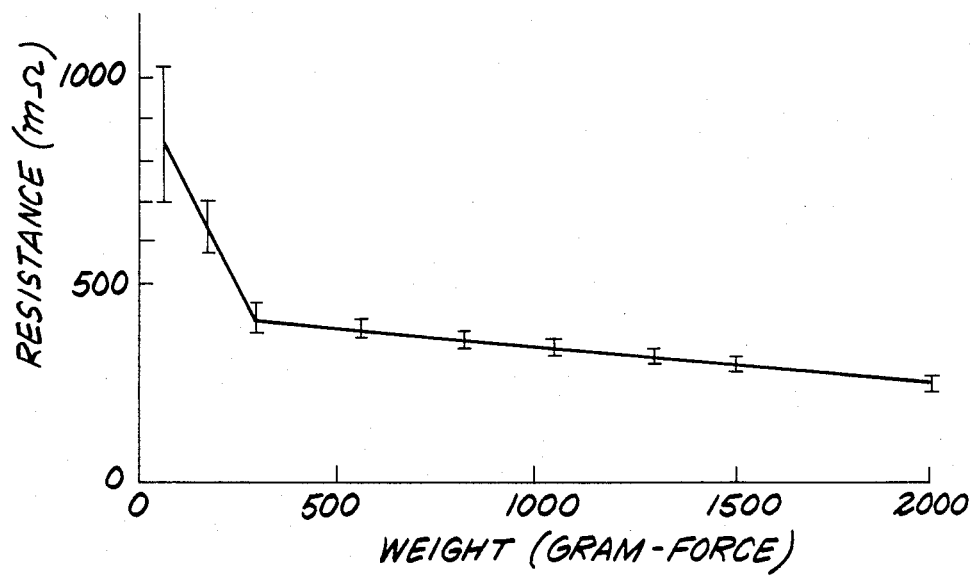
FIG. 3 is a graph of measured sensor resistance as a function of applied force.

Graphite fiber bundles or tows (one tow equals approximately $10^4$ fibers) are commercially available. A commercial flat ribbon type of fiber bundle typically possesses cross sectional dimensions of approximately 5 millimeters in width by 0.1 millimeters in thickness. If two such flat tows are placed across each other, a basic multi-fiber junction is established. Unless the tows are rigidly mounted, the junction resistance may be noisy. Noise is not due to electrical noise, but is due to the fact that the junction is microphonic or seismic. At low levels of pressure loading, the junction may be very sensitive to environmental conditions. This sensitivity is not due to the intra-fiber conductivity change due to fiber distortion, but is a measure of the number of fiber junctions. FIGS. 2a and 2b illustrate, in a schematic fashion, fiber distortion due to applied pressure loading. As the load is increased the fibers are compacted and their freedom to generate noisy junctions is diminished. As the load is increased, the resistance falls uniformly. There is however, as is to be expected, a load limit, beyond which the resistance response may no longer be linear or sensitive to higher applied loads. The load range depends on the fabrication mode of the tows. As FIG. 2a illustrates, the carbon fibers are essentially cylindrical in cross section and when two fibers come into contact, the area of contact is essentially very small. As the fibers are pressed together, the elastic deformation of the fibers, as shown in FIG. 2b causes the contact area to increase. It is this variation in intra-fiber contact area and hence intra-fiber conductivity which causes the conductivity to vary as a function of applied pressure. Graphite fibers are in fact elastically extremely stiff and extremely strong and thereby they permit a very large contact pressure to be achieved before mechanical breakdown occurs. Nonetheless, these fibers still exhibit a very smooth and linear change in conductivity as a function of applied pressure. This variation is particularly illustrated in FIG. 3 which shows a graph of resistance, as measured in milliohms, as a function of weight, as measured in grams-force. (A gram-force is the weight exhibited by a mass of 1 gram.) The data in FIG. 3 was collected with the use of a tactile fiber sensor in accordance with the present invention in which contacts having a diameter of approximately 1.5 inches were employed and between which was sandwiched a ¼ inch thick felt mass of carbon fibers. The carbon fiber felt mass was made from HEXTRAND ® graphite fibers catalog number F3C584 as supplied by the Hexcel Corporation of Dublin, Calif. The curve shown in FIG. 3 illustrates the point made above that with a weight of less than approximately 300 grams of force, the resistance is relatively high and also relatively variable because of the microphonic nature of the fiber bundle contacts. However, at forces greater than approximately 300 grams-force, the variation of electrical resistance is seen to be not only very highly linear, but also decreasingly susceptible to microphonic or seismic noise. With respect to the carbon fibers employed, it is noted that if commercial fibers employed are coated with resin, it is necessary that the resin coating be removed since it is not being particularly used as a reinforcing material and since it interferes with proper electrical contact between the carbon fibers.

Figure 4:
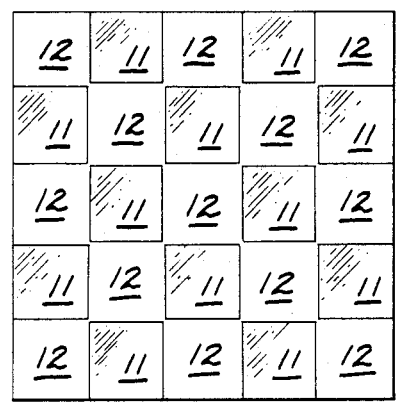
FIG. 4 is a plan view of a tactile sensor similar to that shown in FIG. 1, and more particularly illustrating a checkerboard conductive layer pattern.
Figure 5:
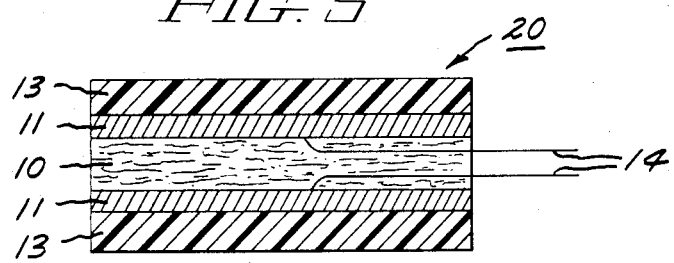
FIG. 5 is a cross-sectional side elevation view illustrating a tactile sensor which is also useful for use in robot systems.

In accordance with one embodiment of the present invention, a plurality of tactile sensors may be configures on an insulating sheet and arranged in a checkerboard patters such as is illustrated in FIG. 4. It is to be particularly noted in FIG. 4 that conductive contacts 11 are configured in a regular pattern but are not permitted to be in electrical contact with one another. It should also be appreciated that, while FIG. 4 illustrates a checkerboard pattern, any other contact patterns may be employed without departing from the spirit of the present invention. In particular, a planar area may be tiled with such polygons as triangles, rectangles, trapezoids, octagons. Additionally, any irregular form of contact pattern may be employed, the only limitation being that adjacent metal contacts are not in electrical connection with one another, but yet are disposed opposite a similarly dimensioned contact on the opposite side of the carbon felt layer. A significant advantage of the contact pattern exhibited, for example in FIG. 4, is that the tactile sensor is capable of providing, to the computer instrumentation and control system for the robot, a detailed force distribution profile so as to be better able to direct the movements of the manipulators. It is also further noted that even with the checkerboard pattern it is possible to readily pass the electrical connection wires through the carbon fiber felt mass to avoid wire runs to the electrodes which pass across the sensing surface. Alternatively, although less desirable it is possible to embed the connecting wires in resilient insulating layer 13. It is also possible to configure the tactile sensor of the present invention in the shape of a washer. Such a configuration is identical to that shown in FIG. 5 except for the presence of a preferably circular aperture extending vertically through layers 10, 11 and 13, so as to define an annular or washer-shaped sensor. In this configuration, it is preferable to employ an insulating sleeve disposed through the hole in the washer. Such a washer-shaped sensor may be disposed under a mounting bolt or an additional redundant bolt may be provided to form a simple, inexpensive load measuring device.

While the sensors of the present invention may, in some circumstances, be employed as contact sensors, their use in this regard is limited. For example, if the sensor is employed to detect physical contact between a moving member such as a robot arm and another object, the utility of the present invention depends on both the velocity of the moving member and the fragility of the contacted object. Accordingly, since physical contact is required by the present sensor, it is unlikely that a rapidly moving member can be stopped before harm occurs to fragile objects contacted by the arm or arm/sensor assembly.

From the above, it should be appreciated that the present invention provides a simple, economical tactile load sensor for robotic applications. It should also be apparent that the tactile sensor of the present invention is flexible and may be configured not only to provide a single pressure or force intensity signal, but may also be configured to provide a plurality of signals indicative of force or pressure distributions. It is also seen that the present invention is easy to manufacture and is employable under hostile environmental conditions of temperature, humidity and even in the presence of many caustic chemical liquids and vapors. Lastly, it is also seen that the present invention may be configured to provide a simple load measurement device.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A tactile sensor, especially for robot grasping manipulators, comprising:
a carbon fiber layer;
a first conductive layer disposed against a first side of said carbon layer; and
a second conductive layer disposed against a second side of said carbon fiber layer, whereby pressure applied to said sensor reduces the electrical resistance between said first and second conductive layers.

2. The sensor of claim 1 further including electrical leads attached to each of said conductive layers.

3. The sensor of claim 2 in which said leads are disposed within said carbon fiber layer.

4. The sensor of claim 1 further including a resilient insulating layer disposed on at least one of said conductive layers, on the side of said conductive layer which is not in contact with said carbon fiber layer.

5. The sensor of claim 1 in which said first and second conductive layers are arranged in a checkerboard pattern so as to define a plurality of sensor elements.

6. The sensor of claim 1 in which said carbon fiber layer and said first and second conductive layers are configured as annular discs so as to form a washer-shaped sensor.

* * * * *